United States Patent [19]

Herring

[11] Patent Number: 4,494,295

[45] Date of Patent: Jan. 22, 1985

[54] METHOD OF INSTALLING FURNACE WALL LINING

[75] Inventor: Thomas M. Herring, Ballwin, Mo.

[73] Assignee: Christy Firebrick Company, St. Louis, Mo.

[21] Appl. No.: 445,210

[22] Filed: Nov. 29, 1982

[51] Int. Cl.³ .............................................. B23P 11/00

[52] U.S. Cl. ........................................ 29/432; 29/458; 29/526 R; 110/336; 52/404; 52/506

[58] Field of Search ...................... 29/432, 458, 455 R, 29/526 R; 110/336; 52/404, 745, 509, 309.12, 506

[56] References Cited

U.S. PATENT DOCUMENTS

| | | | |
|---|---|---|---|
| 2,807,057 | 9/1957 | Mondry | 52/506 X |
| 3,854,262 | 12/1974 | Brady | 52/506 X |
| 3,892,396 | 7/1975 | Monaghan | 52/506 X |
| 4,001,996 | 1/1977 | Byrd, Jr. | 52/509 |
| 4,291,514 | 9/1981 | Harvey | 29/432 X |
| 4,318,259 | 3/1982 | Verheyden | 52/506 X |
| 4,336,086 | 6/1982 | Rast | 52/506 X |
| 4,425,749 | 1/1984 | Parker | 52/404 X |
| 4,429,504 | 2/1984 | Hounsel et al. | 52/404 X |
| 4,433,480 | 2/1984 | Kato | 29/432 |

*Primary Examiner*—Charlie T. Moon

*Attorney, Agent, or Firm*—Gravely, Lieder & Woodruff

[57] ABSTRACT

This application relates to a method for attaching refractory ceramic fiber modules to steel furnace shells. The method allows much flexibility in the application of the fiber modules to the furnace and results in a less expensive and more efficient installation than current installation methods allow. The method involves the use of metal brackets welded to the furnace wall and having a loop on the free end to receive pointed steel rods which impale the modules to secure the same to the furnace wall.

10 Claims, 3 Drawing Figures

METHOD OF INSTALLING FURNACE WALL LINING

BACKGROUND OF THE INVENTION

The present invention relates to a method of installing ceramic fiber modules to a steel furnace shell for insulating the interior of a high temperature furnace.

For many years heat treating furnaces, ceramic kilns, brick kilns, and the like, were lined with dense fireclay brick. Later insulating firebrick replaced the dense fireclay brick because of its lighter weight and better insulating properties. Recently ceramic fiber material made of alumina-silica fibers made into blankets has replaced the insulating firebrick as lining for such furnaces and kilns. The latest advance in this art is the use of ceramic fiber modules in which the ceramic fiber blanket is cut to size and assembled into a module unit of varying sizes, but usually 12″×12″× desired thickness, with the blanket pieces or strips positioned edge grain, single fold or accordian folded and held together by various means to form a unit of construction that can be attached to a furnace wall by welding, screws, cement or other means.

The rolls of ceramic fibers typically are impaled upon alloy studs welded to the furnace walls. This arrangement has several drawbacks, namely that the temperature limit of the construction is dependent on the temperature that the alloy studs can stand. Another drawback is that the ceramic fiber blankets are easily damaged, torn and also tend to shrink with high temperature use so that gaps are formed between the edges of the blankets or shrinkage tears occur.

Recognizing the advantages of module construction over multiple layer construction, a number of module designs and retention devices have been developed.

Typical of such construction are the Sauder U.S. Pat. Nos. 3,819,468 and 3,993,237. These devices still require a welded stud on the furnace frame and time consuming application. Other patents exemplifying this type construction including Balaz et al U.S. Pat. No. 3,832,815 in which a series or strips or ceramic fibers are clamped together into a module for installation on furnace walls. Still other such devices are shown in Byrd U.S. Pat. Nos. 4,001,996 and 4,123,886.

Another patent showing a modular installation is Dunlap U.S. Pat. No. 4,248,023 which shows a shell filled with layered ceramic fiber blankets placed parallel to the furnace wall. Brady U.S. Pat. No. 3,854,262 shows a stack bonded construction using strips of ceramic fiber blanket and does not relate to modular construction.

In ceramic fiber module construction it is desirable to be able to utilize a single installation technique in many different types of installations. For example, in some constructions, it is desirable to apply a layer or layers of ceramic fiber blanket next to the steel shell to serve as a thermal barrier between the modules and the steel shell thereby overcoming any objections to possible heat leaks between modules and also reducing the cost of the lining, because less expensive blanket is used to make up part of lining thickness.

It also is necessary at times to apply a protective membrane or coating directly to the steel shell and to the retention bracket to protect from corrosion, etc.

It further is desirable in certain installations to apply a layer of either aluminum or stainless steel foil over the blanket and behind the modules to serve as a vapor barrier and at a distance from the steel shell to insure that the temperature is high enough to keep vapours above the dew point.

The present invention allows for all of the foregoing variations in installation and construction techniques and in addition, the brackets are welded in predetermined position on the steel shell so that the spacing between brackets is fixed and predetermined, thereby eliminating any possibility of worker error in determining the module density, which is critical to the design of the furnace.

The brackets and the pointed pins which engage the brackets and retain the modules to the wall are positioned within the body of the module away from the free surface of the module to protect the bracket and pins from the heat of the furnace.

Another advantage of the present construction comes about because the brackets are located a predetermined distance apart. As mentioned, this insures uniform and consistent module density and modules also may be installed from both ends of a wall or roof area by two crews with the assurance that when they come together, the closing modules in any given row will fit. This feature improves installation productivity. The closing modules are retained with extra long pins, inserted and then worked back into the closing module with needle-nose pliers which can be worked between the module folds without damage to the module.

Thus, it is a principal object of the present invention to provide a method and apparatus for fastening ceramic fiber modules to furnace walls in a variety of construction configurations using the same hardware. In particular, it is an object of this invention to provide a method of installing ceramic fiber modules in which retaining brackets are welded in a predetermined pattern to the steel shell of a furnace and the shell and bracket optionally can be coated with a corrosion resistant coating, a blanket of insulating fibers can be positioned adjacent to the furnace wall if desired, and a vapor barrier can be placed over the blanket before the modules of ceramic fibers are impaled on a slidable pin engaged with the end of the bracket.

It is a further object of this invention to provide a ceramic fiber module installation method in which the brackets are pre-located to predetermine the module density and the wall or roof can be installed from both ends simultaneously.

These and other objects and advantages will become apparent hereinafter.

The present invention comprises a method of applying ceramic fiber modules to the steel shell of a furnace in an efficient and workmanlike fashion eliminating potential worker errors and providing for the application of a variety of installations with a single system.

DESCRIPTION OF THE DRAWINGS

In the drawings, wherein like numerals refer to like parts wherever they occur.

DETAILED DESCRIPTION

Figure 3:
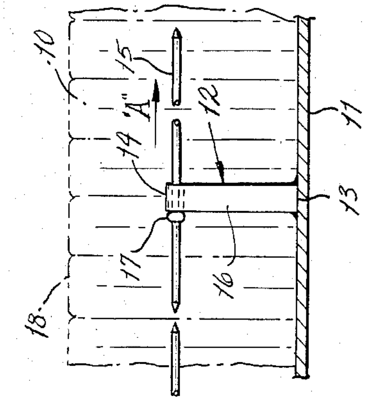
FIG. 3 is an enlarged fragmentary view partly in phantom of a bracket and module attached to a furnace wall.
Figure 1:
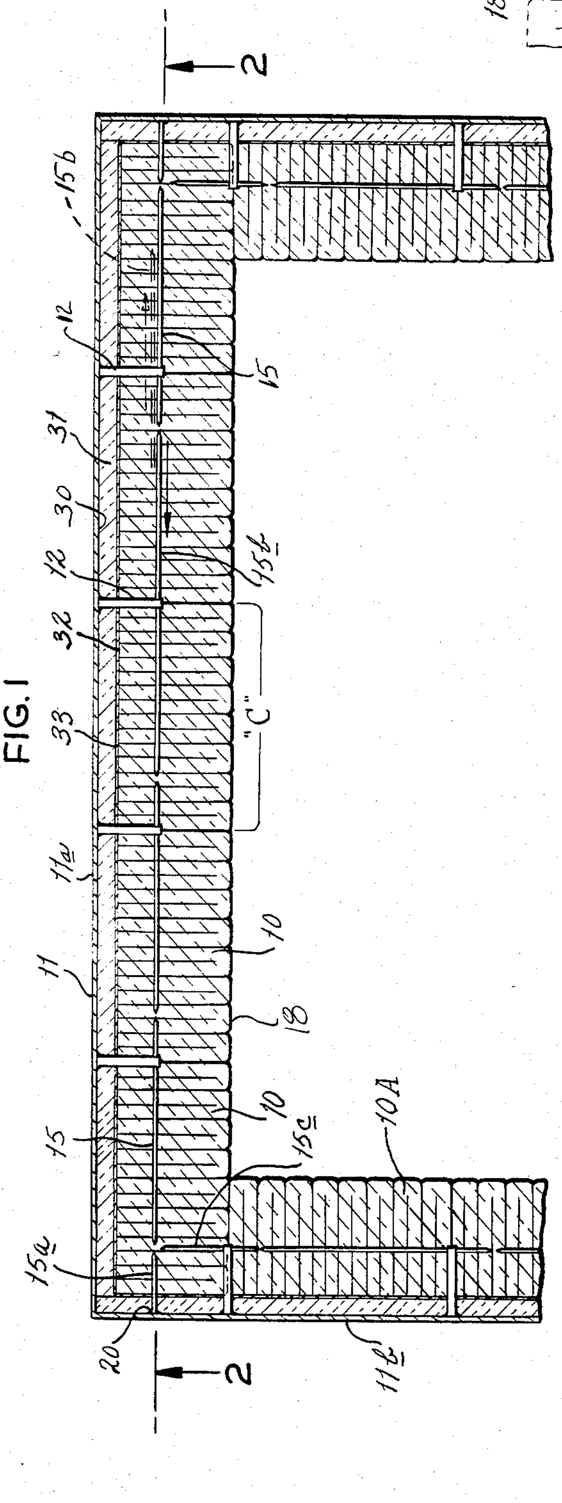
FIG. 1 is a fragmentary horizontal sectional view taken through a furnace wall construction.

FIG. 1 shows a section through a furnace wall with the present invention holding the ceramic fiber modules 10 in place on the steel shell 11 of the furnace. The present invention is shown in more detail in FIG. 3 and comprises a retention bracket 12 having one end 13 welded to the steel shell 11 and a free end 14 formed into a guide which retains a pointed retention pin 15 and serves to guide the pin 15 in a straight line when it is pushed through the guide 14 into the module 10. The bracket body 16 preferably is about five-eighths of an inch in width to assist in its guide function with the pin 15. The pin 15 is crimped at 17 to stop its movement into the bracket loop 14 as it is pushed in the direction of the arrow "A" in FIG. 3. This crimp 17 in the 12 inch length of the pin 15 is about $2\frac{1}{2}$ inches from one end and eliminates worker errors in positioning the pin 15 into the modules 10. As noted, the width of the bracket 12 is such that when the retention pin 15 is pushed through the bracket loop 14, the pin 15 does not wander or penetrate the module 10 on other than a straight line. The pin 15 and brackets 12 can be of mild steel, 304 stainless steel, 310 stainless steel, 330 stainless steel, Inconel 601 or other heat and/or corrosion resistant metal. The brackets 12 and pins 15 are totally immersed in the ceramic fiber module 10 and extend only about 3 inches to 5 inches from the shell 11 into the lining depending on the temperatures involved. This allows less expensive materials to be used for these parts as they are protected from the heat and other corrosive effects present in the furnace itself.

As noted and as shown in FIG. 1, the normal pin 15 used in this construction is 12 inches in length. However, there are other size pins used for specific locations in a furnace wall. At each end of a row of modules 10 is positioned a $3\frac{1}{2}$ inch end pin 15*a*. The end pins 15*a* are welded at 20 to the side walls 11*b* of shell 11 (FIG. 1). In use, the first ceramic fiber module at the end of each row is impaled on the said end pins 15*a* as the row of modules is started from each end.

Another form of pin is used to close each row of modules at the center. This is an 18 inch closing pin 15*b* which is inserted into an adjacent module and is moved rightwardly past the conventional pin 15 and bracket 12 (see broken lines and broken arrow in FIG. 1) so that the closing module "C" can be slid into place in the row. The closing pin 15*b* then is moved leftwardly (as indicated by the solid arrows in FIG. 1) through the closing module "C" by means of a needle-nose pliers inserted between the folds of the module "C". This impales the closing module "C" on the closing pin 15*b*.

The third form of the pin is a corner pin 15*c* which is positioned in a bracket 12 welded to the same shell side 11*b* as the end pin 15*a* at the place where the inner or hot face 18 of the row of modules 10 intersects the said shell side wall 11*b*. The pin 15*c* is slid through the bracket 12 into engagement with the ceramic modules 10 through their outer face 18. Part of the pin 15*c* is still free and the first module 10*a* of the shell end wall 11*b* then is impaled on the free end of the corner pin 15*c*. The rows of modules 10*a* are perpendicular to the rows of modules 10 and are secured thereto by the corner pins 15*c*.

Figure 2:
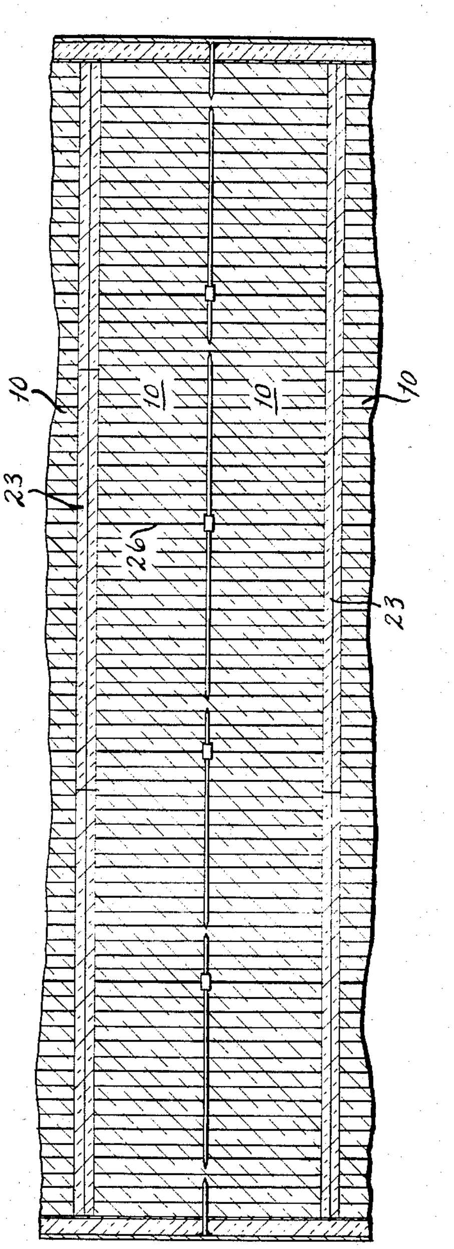
FIG. 2 is a fragmentary sectional view taken along line 2—2 of FIG. 1.

FIG. 2 shows a method of sealing between adjacent rows of modules 10 along any one wall. This involves the use of batten strips 23 of ceramic fibers which are 24 inches in length or some other convenient longer length folded on themselves and inserted between each row 10 of ceramic fiber modules so as to lap the joint 26 between the fiber modules 10.

As illustrated in FIG. 1, the installation includes a corrosion resistant coating 30 positioned on the inner surface of the shell 11, a one inch or thicker blanket 31 of ceramic fiber adjacent to the shell 11 and between it and the outer surface or cool side 32 of the ceramic modules 10. A foil vapor barrier 33 is positioned between the blanket 31 and the cool side 32 of the ceramic modules 10.

These features are optional in some installations, and the present construction allows any or all of these features to be incorporated into the structure without modification of the means for attaching the modules 10 to the shell 11.

The vapor barrier 33 can be aluminum or stainless steel foil and is placed far enough away from the steel shell 11 to keep that interface temperature above the dew point. If aluminum foil, the barrier 33 usually is about 0.004 inches thick, and if steel foil, it is about 0.002 inches thick.

The modules 10 can be of any thickness and can be folded strip, accordian fold or edge grain strip module construction. Suitable materials for the modules include the fiber insulating blankets sold under the names Kaowool (Babcock and Wilcox), Fiberfrax (Carborundum Co.), Cera-Blanket (Johns Manville Co.), and Cer-Wool (C.E. Refractories) and others. The blankets are made from refractory materials, such as chromia-alumina-silica and alumina-silica compositions, and other compositions which withstand high temperatures.

The brackets 12 and the end pins 15*a* can be fastened to shell 11 by ordinary stud welding guns or by stick welding.

The brackets 12 normally are spaced 12 inches apart in a regular even pattern. This insures uniform module density regardless of the skill of the installers because each of the modules 10 must be pressed into the space between the brackets 12. The spacing of the brackets 12 can be reduced to $11\frac{1}{2}$ or 11 inches or less, if greater module density is desired. It is to be noted that each strip or fold of each module 10 is positively secured by one of the pins 15–15*c*.

The use of the folded batten strips 25 in the joints 26 between the rows of modules 10 insures a relatively shrink-free joint which is not possible with modules placed in a parquet fashion.

This present invention is equally applicable to roof areas as it is to the illustrated wall areas. It can be used with flat, round, conical, or domed surface areas.

Any damaged module 10 can be replaced easily by sliding the pin or pins 15, 15*b* or 15*c* which retains it, removing the damaged module, placing a new module 10 into the opening left by the damaged module, and threading the retaining pin into the new module.

INSTALLATION

In installing the ceramic fiber modules 10 in a steel shell 11, the brackets 12 are welded to the interior of the shell side walls 11*a* and end walls 11*b* in a predetermined pattern, usually such that the spacing between the brackets 12 along the shell side walls 11*a* accommodate a 12 inch module. The spacing can be less if a more dense module is desired.

The end pins 15*a* also are welded in place on the shell end walls 11*b* at the ends of each row of brackets 12 which are positioned on the shell side walls 11*a*.

The brackets 12 which are welded to the shell end walls **11*b* also are fixed in a predetermined pattern such that the end brackets in each row are positioned at the inner surface of the shell side wall modules. The remaining shell end wall brackets 16 are then spaced, usually so as to accommodate a 12 inch module 10 therebetween, but closer is a more dense module 10** as desired.

The modules 10 then are laid and preferably at least two teams of installers work, one starting at each end of the shell side wall **11*a* and work toward the center module "C". The modules 10 are first impaled on the end pins 15*a*; then positioned inside the next adjacent bracket 12. The usual retainer pin 15 then is inserted through the end loop 14 of the said next adjacent bracket 12 until the stop 17 engages the bracket loop 14**.

On that portion of the pin 15 which has not entered the bracket loop 14 is impaled the next module 10 to be installed. It too is also positioned between two adjacent brackets 12 and the foregoing procedure is repeated.

When the center or closing module "C" is reached, the closing pin **15*b* is used. It is thrust into a bracket loop 14 into the body of the module 10 so as to bypass the next pin 15 and bracket 12 (see broken lines in FIG. 1). The center module "C" is positioned between the two center brackets 12 and the closing pin 15*b* is worked back into the closing module "C" in the direction of the arrow in FIG. 1 by inserting a long-nose pliers into the module 10 between the folds of the ceramic fiber to engage the pin 15*b*** and urge it into the center module "C".

The foregoing is repeated for each row of modules 10 along the shell side walls **11*a***.

The shell end walls **11*b* are installed by first positioning the corner pins 15*c* through the end most brackets 12 into the module 10 already in place for the shell side walls 11*a*. Then a module is positioned over the free end of the corner pin 15*c* between the adjacent brackets 12 and the procedure for laying the side walls 11*a* is repeated for the end walls 11*b***.

If the corrosion resistant coating 30 is desired, it is placed on the shell 11 after the brackets 12 and end pins **15*a*** are in place. It can be applied in any manner known in the field such as painting or spraying. Typical corrosion resistant coating include asphaltic base compounds such as Stolastic, epoxy base coatings and other corrosion (acid) resistant coatings and membranes.

If the thermal blanket 31 is desired it is placed over the installed end pins **15*a* and brackets 12. Similarly, if the foil vapor barrier 33 is desired, it too is placed over the blanket 31. Both blanket 31 and foil 33 can be readily pierced over end pins 15*a* and brackets 12**.

What is claimed is:

1. A method of installing ceramic fiber modules in a shell comprising the steps of:

(a) attaching in a predetermined pattern a plurality of brackets to an inside wall of the shell so as to define a series of spaces to receive ceramic fiber modules, each of the brackets having one end attached to the shell and a guide formed on the free end, (b) placing a ceramic fiber module into the space defined between adjacent brackets so as to project into the interior of the shell area a greater distance than the bracket guide, (c) inserting retaining means through one of said bracket guides into the body of said module contained between said adjacent brackets such that a portion of said retaining means remain in the space between said one bracket and the next adjacent bracket, and (d) placing a second ceramic fiber module into said latter space and impaling the same on the portion of said retaining means remaining in said space.

2. The method of claim 1 wherein the brackets are positioned in parallel horizontal rows, and the retaining means is a pin with a detent intermediate its ends to limit movement through the guide and define the portion of said retaining pin which remains in the space between said bracket and the next adjacent bracket.

3. The method of claim 2 including the step of attaching end pins to shell walls perpendicular to the wall on which the brackets are attached, the end pins being aligned with the rows of brackets to retain the end modules in each row, said end pins being attached before the modules are positioned between said brackets.

4. The method of claim 2 including the step of positioning second rows of predetermined spaced brackets on shell walls perpendicular to the shell wall on which the first rows of brackets are positioned, said second rows of brackets being co-planar with the first rows and with the first bracket in each row being located at the free ends of the ceramic fiber modules located in said first row of brackets.

5. The method of claim 4 including the step of inserting a corner pin through the guides of said first bracket into the said ceramic fiber module so as to lock the perpendicular rows of fiber modules together at the corners of each row.

6. The method of claim 1 including the steps of starting the placing of ceramic fiber modules defined in steps (b)-(d) at each end of the said row of brackets and closing the row at the center by inserting a closing pin, having a length greater than the spacing between adjacent brackets, into one of the bracket guides defining the center space from the open center space and through the module in the next space past the bracket and into the next adjacent module, until the center pin clears the center space, positioning a module in the center space and impaling the same on that portion of the retaining pin which extends from the opposite bracket, and then locking the center module in place by withdrawing the center pin from the modules into which it has been placed and inserting said pin into the closing module to anchor said closing module in said center space.

7. The process of claim 1 including the step of placing a corrosion resistant coating on the inside of the shell.

8. The process of claim 1 including the step of placing a ceramic fiber blanket over the brackets and into engagement with the inside of the shell.

9. The process of claim 8 including the step of placing a foil vapor barrier over the fiber blanket and behind the ceramic fiber modules.

10. The method of claim 2 including the step of placing a horizontal strip of ceramic fiber blanket between adjacent horizontal rows of ceramic fiber modules.

* * * * *